(12) United States Patent
Markiewicz et al.

(10) Patent No.: US 11,151,015 B2
(45) Date of Patent: Oct. 19, 2021

(54) MACHINE-BASED RECOGNITION AND DYNAMIC SELECTION OF SUBPOPULATIONS FOR IMPROVED TELEMETRY

(71) Applicant: MICROSOFT TECHNOLOGY LICENSING, LLC, Redmond, WA (US)

(72) Inventors: Marcus Eduardo Markiewicz, Teaneck, NJ (US); Krikor Nigoghosian, Jr., Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 16/283,703

(22) Filed: Feb. 22, 2019

(65) Prior Publication Data

US 2020/0272552 A1    Aug. 27, 2020

(51) Int. Cl.
*G06F 11/34* (2006.01)
*G06F 11/30* (2006.01)
*G06N 20/00* (2019.01)
*G06F 11/36* (2006.01)

(52) U.S. Cl.
CPC ........ *G06F 11/3495* (2013.01); *G06F 11/302* (2013.01); *G06N 20/00* (2019.01); *G06F 11/3668* (2013.01)

(58) Field of Classification Search
CPC ............... G06F 11/3006; G06F 11/302; G06F 11/3072; G06F 11/3409; G06F 11/3438; G06F 11/3452; G06F 11/3476; G06F 11/3495; G06F 11/3668; G06F 2201/865; G06N 20/00

USPC ......................................................... 702/182
See application file for complete search history.

(56) References Cited

U.S. PATENT DOCUMENTS

| 7,165,190 | B1 | 1/2007 | Srivastava et al. |
| 7,194,533 | B1 | 3/2007 | Deluca |
| 9,590,880 | B2 | 3/2017 | Ashby et al. |
| 11,023,826 | B2 * | 6/2021 | Belyaev ............... G06F 16/248 |

(Continued)

OTHER PUBLICATIONS

"International Search Report and Written Opinion Issued in PCT Application No. PCT/US2020/016722", dated Jun. 18, 2020, 11 Pages.

*Primary Examiner* — John H Le
(74) *Attorney, Agent, or Firm* — NovoTechIP International PLLC

(57) ABSTRACT

Techniques for telemetry data collection including receiving first telemetry data items each including a first value for a first performance measurement, generating respective data objects providing values for a first set of attributes including multiple context attributes and a performance attribute determined based on the first value, performing a machine-based selection of outlier data objects from the data objects, obtaining a targeting rule specifying selection conditions for at least two of the context attributes and corresponding to a selected subset of the outlier data objects, providing the targeting rule to multiple telemetry sources, and receiving second telemetry data items each associated with a different telemetry source that satisfied the selection conditions, and each including a second value for a second performance measurement, with the first telemetry data items not including values for the second performance measurement.

19 Claims, 8 Drawing Sheets

(56) References Cited

U.S. PATENT DOCUMENTS

| | | | |
|---|---|---|---|
| 2005/0021748 A1 | 1/2005 | Garcea et al. |
| 2005/0210477 A1 | 9/2005 | Auerbach et al. |
| 2010/0153069 A1 | 6/2010 | Giese et al. |
| 2010/0251218 A1 | 9/2010 | Mahesh et al. |
| 2012/0159454 A1 | 6/2012 | Barham et al. |
| 2012/0167057 A1 | 6/2012 | Schmich et al. |
| 2013/0343619 A1 | 12/2013 | Criminisi et al. |
| 2013/0346466 A1 | 12/2013 | Zhang et al. |
| 2013/0346917 A1 | 12/2013 | Bragdon et al. |
| 2014/0189086 A1 | 7/2014 | Chattopadhyay et al. |
| 2015/0304398 A1 | 10/2015 | Letca et al. |
| 2016/0147585 A1 | 5/2016 | Konig et al. |
| 2017/0060731 A1 | 3/2017 | Sivalingam et al. |
| 2017/0132057 A1 | 5/2017 | Zhang et al. |
| 2017/0132111 A1 | 5/2017 | Ravindranath sivalingam et al. |
| 2017/0147466 A1 | 5/2017 | Giese et al. |
| 2017/0187782 A1 | 6/2017 | Crawford et al. |
| 2018/0004573 A1 | 1/2018 | Markiewicz et al. |
| 2018/0234443 A1 | 8/2018 | Wolkov et al. |
| 2018/0260304 A1 | 9/2018 | Matousek et al. |
| 2018/0285240 A1 | 10/2018 | Kou et al. |
| 2018/0300180 A1 | 10/2018 | Shepard et al. |
| 2018/0365093 A1 | 12/2018 | Musuvathi et al. |

\* cited by examiner

MACHINE-BASED RECOGNITION AND DYNAMIC SELECTION OF SUBPOPULATIONS FOR IMPROVED TELEMETRY

BACKGROUND

In order to optimize performance of various programs, developers traditionally seek to find and remove sources of problems and failures of a software product during product testing. In some cases, testing of the software product can continue after the product is released to end-users. For example, software can include error reporting services that are configured to allow information regarding various software problems to be collected and communicated to developers. When a failure or error occurs, the error reporting service can collect information about the operating conditions on the computer leading up to the error. This information, along with similar error reports from other computers executing the same application, may be sent to a central server, creating a database of failure that can be analyzed to identify software bugs that can be corrected.

Similarly, software vendors may seek to refine and improve their software products over time, without necessarily responding to error messages. Thus, they may collect software quality metrics on the software product while it is being used by customers. This ongoing process of collecting software quality metrics can increase the likelihood of identifying areas in which the software can be improved. These metrics can relate to frequency and nature of use of software components, usability, reliability, and execution speeds of the software product. Such metrics may be generated by the software program or may be calculated from raw instrumentation data output by a software product as it executes. Upon computation, the metrics may be transmitted to the central location for aggregation and analysis with metrics from other computing devices.

It can be understood that processing data from users at internet-scale for devices is cost prohibitive, both in bandwidth, as well as processing time. In order to achieve large-scale collection and processing of data, more efficient methods are needed to aid in identifying potential new sources of improvement and corrections for the software. Thus, there remain significant areas for new and improved ideas for collecting data and efficiently processing such data.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Retrieving large amounts of data over the network may consume valuable server and network resources and may overly burden the server when collecting data from large numbers of applications. Additionally, a service provider may need to install separate tools on the client devices to facilitate data monitoring and analysis. Direct interaction with the client devices may also be necessary to collect and analyze data. Furthermore, application data may continuously change over time, which may compound the difficulties of collecting and monitoring data for software instances executed across a large number of distributed client devices. The following techniques are disclosed to address these issues by use of machine-based algorithms by which data can be analyzed and information is more selectively and/or meaningfully harvested and acted on.

Figure 1:
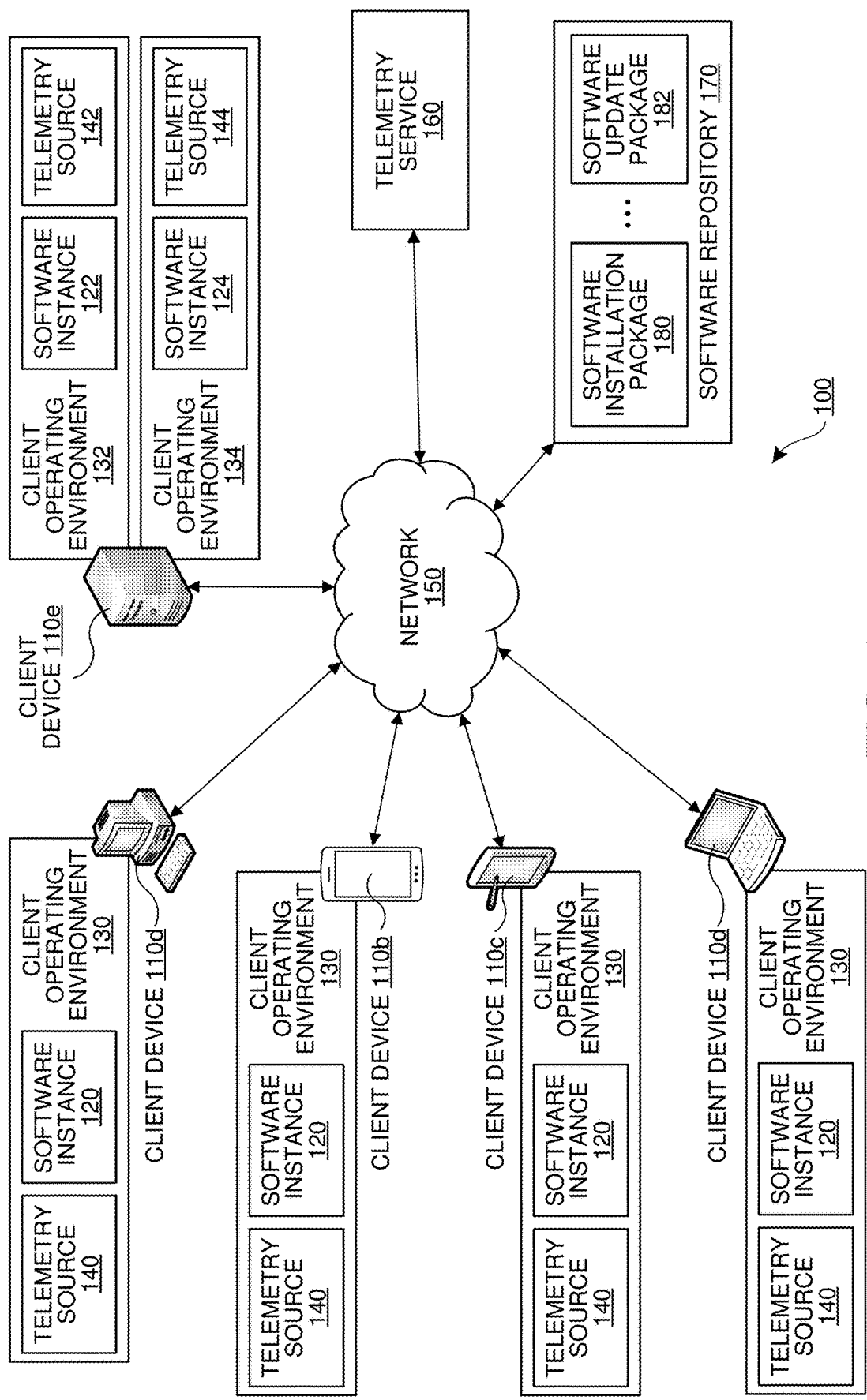
FIG. 1 is a conceptual illustration of an implementation of a telemetry management environment.

FIG. 1 illustrates a higher-level system ("system") 100 in which some of the proposed techniques described herein may be implemented. The system 100 includes a number of client computing devices 110, which may also be referred to as client devices 110. In different implementations, one or more of the client devices 110 can, via telemetry sources 140, communicate with telemetry service 160 via a data communication network 150. The client devices 110 each may be any suitable computing device capable of executing computer instructions, such as, but not limited to, a desktop computer 110a, smartphone 110b, a tablet computing device 110c, a notebook computer 110d, and a server computing system 110e.

In the example illustrated, the system 100 includes a single instance of a number of different types of computing devices 110, each having its own respective performance characteristics. However, it should be understood that this disclosure is not limited in this respect, and the techniques described herein can be used to collect information from a single computer, a set of multiple homogeneous types of computers, and/or with any number of instances of any number of different types of computers. In one implementation, the client devices 110 each provide one or more of a client operating environment 130 (which may be referred to as an "operating environment"), in which a respective software instance 120 of an installed base of a software component and a telemetry source 140 are executed by the client device 110, as will be discussed in greater detail below with reference to FIG. 3. As an example, each of the client devices 110a, 110b, 110c, and 110d include an operating environment 130 as well as a software instance 120 and a telemetry source 140. An operating environment 130 may include hardware components of its respective client device 110 and resources (including, for example, allocated amounts of partial resources) provided by the client device 110 for execution of the software instance 120 such as, but not limited to, compute (processor type, number of cores or processors, processor frequency, etc.), memory, storage, and network hardware and resources.

As a general matter, a "software component" may be any suitable type or types of software, and may include any suitable set of computer-executable instructions implemented or formatted in any suitable manner. Software components may be implemented as application software, although the techniques described herein are applicable to other types of software components, such as system software (e.g., components of an operating system).

In some implementations, a client device 110 may provide multiple operating environments 130 and/or software instances 120. An example of this is depicted with reference to the server computing system 110e, which includes a first operating environment 132 with a first software instance 122 and a first telemetry source 140, as well as a second operating environment 134 and a second software instance 124 and a second telemetry source 144. In some implementations, multiple operating environments operate concurrently, while in other implementations, they operate at different times, but with different configurations. For example, each of the first operating environment 132 and second operating environment 134 may be associated with two different user accounts. In some implementations, first operating environment 132 and second operating environment 134 may be virtualized operating environments, such as but not limited to virtual machines, containers, or jails. In some implementations, a single telemetry source 140 may be used for multiple operating environments 130 of a client device 110.

As shown in FIG. 1, in different implementations, the telemetry service 160 is configured to monitor performance of software instances 120 via telemetry data items received from the telemetry sources 140. The telemetry service 160 is further configured to make use of the received telemetry data items to detect, diagnose, and resolve issues indicated by the telemetry data items. Because the telemetry service 160 is located remotely relative to the client devices 110 and, in some instances, some or all of the client devices 110 may have intermittent or otherwise limited access to the network 150 for communicating with the telemetry service 160, it is difficult and/or costly for the service to receive, store, and analyze a large volume of raw telemetry data items from each of the telemetry sources 140.

In order to reduce the volume of telemetry received by the telemetry service 160 while providing the ability to collect meaningful telemetry data from a large population of telemetry sources 140, in different implementations, the telemetry sources 140 are configured to respond to targeting rules that control the conditions under which telemetry data items are produced and what information they contain. As described herein, the telemetry service 160 is configured to perform a machine-based analysis of received telemetry data items to detect and assess performance-related issues and provide targeting rules to the telemetry sources 140. These rules, when applied by the telemetry sources 140, produce new targeted telemetry data items that facilitate the resolution of performance issues and distribution of updated software components, such as software installation package(s) 180 and/or software update package(s) 182 distributed to the client devices 110 via a software repository 170.

As noted above, increased user-perceived latency can have a significant negative effect on user experience. Thus, for software components involving graphical user interface interactions, it can be important to monitor and more quickly recognize and resolve issues resulting an increased user-perceived latency. In general, user-perceived latency is set forth in the concept of a critical path that provides a bottleneck path in a user transaction, such that changing the length of any part of the critical path changes the user-perceived latency. For example, the critical path can start with a user input event and end with a GUI update event. Synchronous tasks and asynchronous tasks (e.g., threads) triggered by the user input event can help determine the path to the 'end' event. It can be understood that many intermediate actions may be performed for and during such a transaction. There is also varying scope for user-perceived latency. In some cases, the user-perceived latency can impact the responsiveness of one UI while other UIs remain responsive. In some other cases, the impact can be more global and affect most or all UIs, including UIs for other software components. It should be understood that there are some user transactions initiated by a user input event but do not end with a UI update. For example, a background task may continue processing past the UI update, without impacting user-perceived latency. In other words, a user transaction need not always end with a UI update. Input/output latencies with storage devices, such as for read or write operations.

Figure 2:
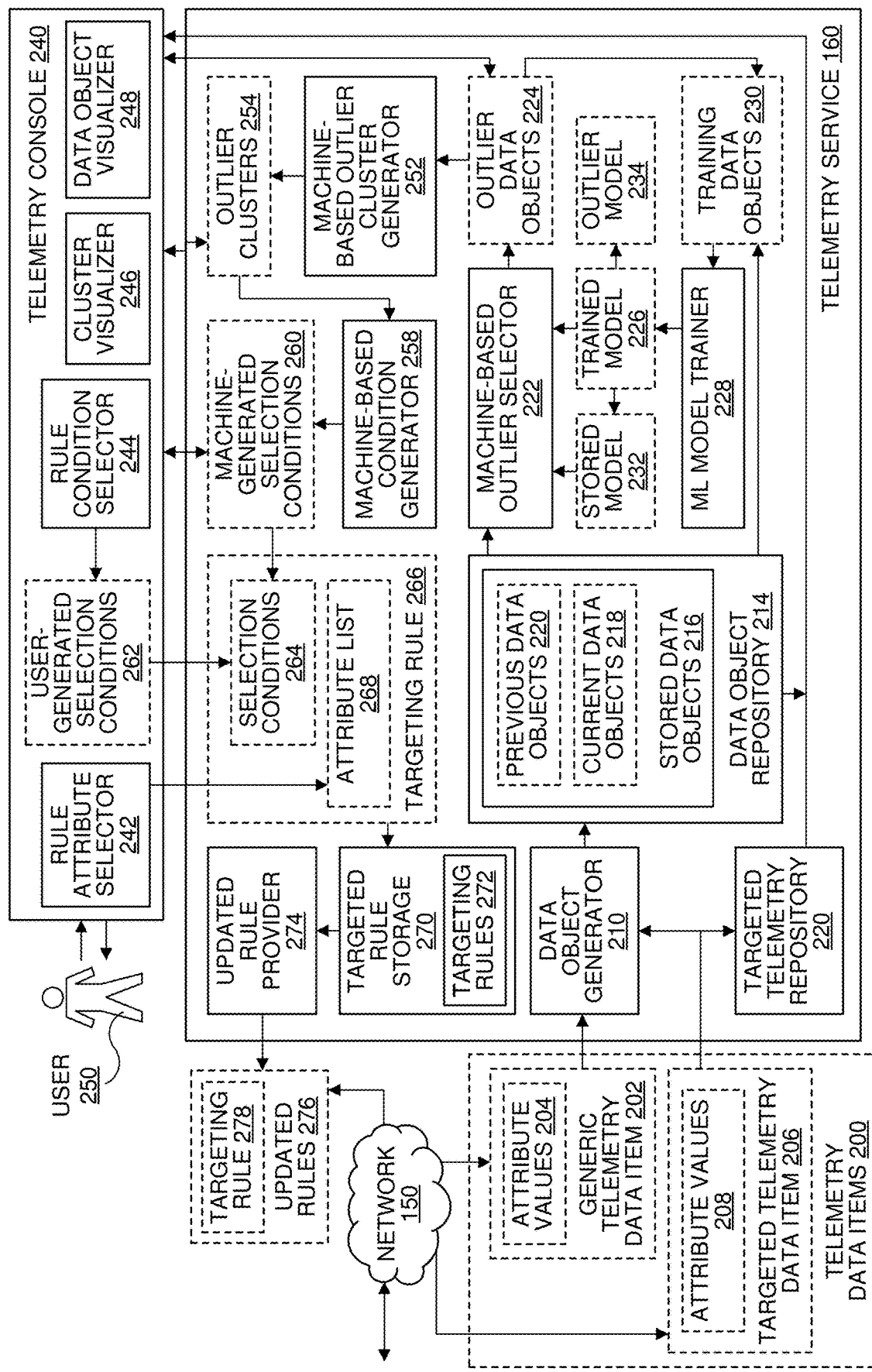
FIG. 2 is a conceptual diagram illustrating an implementation of a distributed computing environment architecture for managing a telemetry data service.

Referring now to FIG. 2, an example implementation of the telemetry service 160 is presented. As discussed above, the telemetry service 160 is configured to receive via the network 150 telemetry data items 200 from telemetry sources 140 executing on the client devices 110. In this example, the telemetry sources 140 are configured to provide targeted telemetry data items 206 according to targeting rules for which associated selection conditions for a plurality of attributes have been met. The targeted telemetry data items 206 each provide a set of one or more attribute values 208 (which may be referred to as "targeted attribute values"). The concept of targeting rules will be discussed in greater detail below. In some implementations, the telemetry sources 140 are configured to provide generic telemetry data items 202 each providing a set of one or more attribute values 204 (which may be referred to as "generic attribute values"). In some examples, a generic telemetry data item 202 as a "default" telemetry data item provided when no targeting rules have not been selected or triggered for a corresponding telemetry source 140. Further details of telemetry sources 140 providing targeted telemetry data items 206 and generic telemetry data items 202 are discussed in connection with FIGS. 3, 5A, and 5B.

As a general matter, there are two broad types of attributes for which telemetry data is received and can be used to identify a subpopulation of telemetry sources 140 from which specific telemetry data is desired or requested. For purposes of reference, the first type of attributes will be referred to as "performance attributes" (which may also be referred to as "performance measurements") and the second type of attributes will be referred to as "context attributes." Some examples of performance attributes include, but are not limited to, (1) call flow measurement; (2) logging events during software execution; (3) receiving an invocation message indicating invocation of an application programming interface (API); (4) network packet loss; (5) bandwidth; (6) heap allocation; (7) power; (8) boot time; (9) exception paths in code; (10) UI render/update times (user-perceived latency); (11) storage transaction latency measurements for selected operations; (12) latency measurements for performing selected operations; (13) failure rate; (14) availability; (15) number of times a user interacted with a given UI element or feature of a software instance, and other such parameters associated with the operation of the software instance. Some examples of context attributes can include (1) operating environment information; (2) software version (for example, a version identifier or whether a debug or retail version); (3) a build number of the software; (4) hardware information associated with a client device (for example, platform type and hardware component details); (5) software environment information associated with an operating environment; (6) geographic location; (7) user, customer, and/or organization information (for example, such information that does not include personally identifiable information); (8) operating system details (for example, type of OS, version identifier, etc.); (9) information about other software products that are also executing within the operating environment; and (10) other attributes associated with the client device on which the software instance is installed.

It can be appreciated that context attributes may affect performance attributes to varying degrees. Thus the values of the context attributes can help identify conditions in which performance will be affected or degraded. In addition, context attributes can be used to help reproduce conditions in which a performance issue has occurred or is occurring. By selecting the context attributes that are associated with the performance issue, and conveying these selections back to the larger population of telemetry sources 140, a subpopulation of the telemetry sources 140 may be identified for collecting information that is more directly relevant to the debugging process. As will be discussed below, machine learning models can be used to more effectively, efficiently, and precisely narrow or refine the context attributes and/or performance attributes which are relevant to specific telemetry sources 140 from which further data should be collected.

For purposes of clarity, it can further be understood that context attributes can be designated as either dynamic or static. A static context attribute either has a fixed value for a client operating environment or is reasonably expected to remain unchanged during a telemetry data collection period. A dynamic context attribute will encompass values that are not static; in other words, dynamic context attributes are changeable, and/or likely to change over the telemetry data collection period.

A targeted telemetry data item 206 is provided by a telemetry source 140 that has determined it has met specified selection conditions for a targeting rule. Such use of the targeting rule by multiple telemetry sources 140 results in a self-selected subpopulation of telemetry sources 140 meeting the selection conditions for a plurality of attributes, which may be referred to as "dynamic population slicing." Targeted attribute values 208 are obtained and included in the targeted telemetry data item 206 for attributes specified for the targeting rule. Multiple targeting rules may be concurrently deployed to the telemetry sources 140, with each targeting rule directed to collecting telemetry data for context attributes and/or performance attributes specifically selected for a particular underlying purpose from a subpopulation relevant to that purpose. The targeting rules are able to efficiently make use of data bandwidth while collecting useful and effective telemetry data for their respective purposes.

As discussed in more detail below, in some examples a targeting rule can be created in response to a new performance-related issue being identified to collect telemetry data to address the issue, and the selection conditions for selected attributes and/or the attributes being provided by responsive target telemetry data items can change to meet the current activities for addressing the issue. In some examples, a targeting rule may be created to monitor a specific subpopulation to identify new issues for that particular subpopulation. For example, for a subpopulation to which a particular service-level agreement (SLA) applies, one or more target rules may be created with selection conditions targeting that subpopulation and also based on a performance guarantee of the SLA, such as by selecting a performance attribute relevant to the performance guarantee and a condition on the selected performance attribute that detects when the performance guarantee was not met or detects an issue in advance of it leading to a failure to meet the performance guarantee.

In some implementations, there is an ongoing collection of generic telemetry data items 202 from across a large population of telemetry sources 140, including telemetry sources 140 that do not provide targeted telemetry data items 206 for corresponding periods of time. As a result, the telemetry data items 200 as a whole are able to provide an understanding as to how the software instances 120 perform in a more diverse range of operating environments and situations. With this more diverse information, an understanding of what is "normal" performance can adjust over time, and new issues are more likely to be detected. The generic telemetry data items 202 provide generic attribute values 204 for a set of attributes that, rather than being selected for a particular purpose, may instead be selected based on its general effectiveness for detecting new performance issues, such as significant negative changes in performance, across a broad and diverse population of telemetry sources 140. For some issues, the collected generic attribute values 204 may allow a performance anomaly to be detected, but may not provide sufficient information to permit identification of a narrow subpopulation of telemetry sources for which this issue is occurring or predicted to occur, which can lead to an overbroad or too-large amount of data for analysis. Thus, generic telemetry data items 202 are not ideal for allowing a software developer to diagnose an underlying cause and a corresponding approach to improve or address the anomaly. As an example, the attribute values 204 may indicate at least some of the software instances 120 experienced a performance issue, but the attribute values 204 may not allow a determination of whether the issue was caused by software component code or the conditions in which the software instance 120 was executed (e.g., a different software component that is interfering with execution of the software component of interest).

In some implementations, generic telemetry data items 202 may be referred to as "concise" and targeted telemetry data items 206 may be referred to as "verbose," to reflect a relative volume of telemetry data that is being received, with respect to one or more attributes (for example, a targeted telemetry data item 206 includes a first volume of data for a first attribute, whereas a generic telemetry data item 202 includes a smaller second volume of data for the first attribute or does not include data for the first attribute) and/or total sizes of telemetry data items (for example, a targeted telemetry data item 206 has a greater total size than a generic telemetry data item 202). In such implementations, the generic attribute values 204 provide limited and compact sets of attributes and, on the other hand, targeted attribute values 208 are for larger, detailed, and in-depth sets of attributes that have been selected to more specifically target telemetry sources and/or collect performance data that is more relevant to the purpose of the collection.

In different implementations, as depicted in FIG. 2, generic attribute values 204 can include one or more performance attribute values for respective performance attributes measuring performance of one or more operations performed by a software instance 120. Furthermore, generic attribute values 204 can also include one or more context attribute values for respective context attributes. In some implementations, a generic telemetry data item 202 and/or its respective generic attribute values 204 may be provided to a data object generator 210 of telemetry service 160. Additionally, in some implementations, a targeted telemetry data item 206 and/or its respective targeted attribute values 208 may be provided to the data object generator 210. In some cases, the targeted telemetry data item 206 and/or its respective targeted attribute values 208 can also be conveyed to a targeted telemetry repository 220 for storage or further management.

In this example, the telemetry service 160 is configured to provide each received generic telemetry data item 202 or its respective attribute values 204 to a data object generator 210, which is further configured to generate a new data object 212 for the generic telemetry data item 220. The new data object 212 includes at least one performance attribute and at least two context attributes. This allows for a more in-depth and sophisticated analysis of the data and can result in a more effective use of system resources in troubleshooting or identifying the presence and type of issues, as well as underlying causes. Such data can also increase the likelihood of generating solutions that address the problem(s).

In some examples, the data object generator 210 is configured to generate an attribute value for the new data object 212 based on one or more attribute values of a telemetry data item 200. As one example, an attribute value 204 may simply need to be changed or transformed from a first format or encoding to a different format or encoding that will be used for the new data object 212. As another example, an attribute value for the new data object 212 may be generated by applying one or more mathematic and/or logic operations to one or more of the attribute values. In some cases, the new data object 212 may not include values for certain attributes not applicable to certain telemetry sources 140 due to software, hardware, and/or situational limitations. For example, the corresponding software instance 120 and/or client operating environment 130 may lack associated features, be unable to provide the underlying data for an attribute, or related operations may not have been performed during a period of time associated with a telemetry data item 200. As shown in FIG. 2, in different implementations the telemetry service 160 is configured to provide the new data object 212 to a data object repository 214, which is further configured to store and maintain the received new data object 212 as one of multiple stored data objects 216.

It can be appreciated that certain attribute values for one or more attributes can be associated with, encompass, implicitly indicate, or otherwise allow attribute values to be inferred for other attributes. Likewise, certain attributes can be inferred for other attributes. For example, a type of hard drive or other component of an operating environment in which a software instance is executed can be understood to be associated with or identify context attribute values for a further set of context attributes about that component or operating environment. Also, in some cases, certain attribute values may be inferred from the selection conditions for a targeting rule that caused a targeted telemetry data item 206 to be generated; for example, if the selection conditions are specific to tablet computing devices, a "device type" context attribute value can be inferred. Inferable attribute values (which may be referred to as "inferred attribute values") can be supplied or included by the telemetry service 160 (e.g., at the data object generator 210 and/or the data object repository 222) and do not need to be included in the telemetry data items 200, reducing the volume of data, bandwidth, and time needed for collecting telemetry data. In some implementations, in response to a determination that a first attribute value may be inferred from a second attribute value, the data object repository 222 can omit storage of the inferable first attribute value if it stores the second context attribute from which it can be inferred. Furthermore, in some implementations, the system may recognize that a stored first attribute can be used to infer a second attribute and 'learn' that the second attribute is effective for selecting telemetry sources demonstrating certain types of issues. Use of such inferable attributes can facilitate the ability of the system to better distinguish among various types of issues.

In different implementations, the data object repository 214 is also configured to receive a request for specific information, retrieve information from the stored data objects 216 responsive to the request, and provide the retrieved information in response to the request. The provided information may be in the form of structured data object records and/or attribute values from responsive stored data objects 216. In some examples, the data object repository 214 includes a database system capable of processing complex queries on the stored data items 214.

In addition, a machine-based outlier selector 222 may be configured to select a set of training data objects 230, for example a set of current data objects 218 can be selected, and the training data objects 230 provided to an machine-learning (ML) model trainer 228 to produce, generate, and/or update a trained model 226 that is used by the machine-based outlier selector 222. The trained model 226 is used to select outlier data objects 224 from the current data objects 218 currently being analyzed by the machine-based outlier selector 222. In some implementations, the trained model 226 may be retained as a stored model 232 for subsequent use by the machine-based outlier selector 222 to identify outlier data objects 224 for additional analysis operations. The telemetry service 160 may be configured to select the current data objects 218 based on the goals of the analysis performed by the machine-based outlier selector 222. In some examples, a corresponding request may be limited to a stored data objects 216 corresponding to a specified period of time; for example, only stored data objects 216 for the last week may be requested. In some examples, only stored data objects 216 that were generated in response to one or more specified targeting rules (which may be recorded in association with the stored data objects 216) may be requested to focus the analysis on telemetry data items that may be more directly relevant to addressing a specific issue or group of issues. In some examples, the stored data objects 216 may be requested based on the values of one or more specified attributes; for example, it may be desired to focus the analysis on a particular type of client device, such as tablet computing devices.

In some implementations, the ML model trainer 228 uses an unsupervised machine learning technique on unlabeled training data objects 230 to generate the trained model 226. A number of such techniques are available for performing detection of outlier data objects within or based on a larger set of data objects. For example, Breunig et al. in article "LOF: Identifying Density-Based Local Outliers" describes techniques for calculating a "local outlier factor" for individual data objects.

A threshold value may be used in connection with the local outlier factors to select a population of outlier data objects 224 of various sizes. There are also a variety of density-based clustering approaches that can be similarly applied. For example, techniques such as, but not limited to, DBSCAN and OPTICS and variations thereupon can be used to identify one or more clusters of data objects within the training data objects 230. In some implementations, the residual training data objects 230 not assigned to any of the resulting clusters, or a selected subject of the residual training data objects 230, may be selected as the outlier data objects 224.

Many density-based approaches produce models described in terms of individual data objects and respective values determined by the ML model trainer 228 in the course of generating the trained model 226, in contrast to parametric model definitions not directly linked to individual training data objects 230. Thus, for such density-based approaches it is useful to retain the resulting trained model 226 as stored model 232 in order to make later use of the understanding of combinations of attributes that were previously determined to be normal. For example, the ML model trainer 228 may be configured to use the stored model 232 and its associated data objects as an initial model to which newer training data objects 230 can be incorporated, resulting in a trained model 226 that reflects characteristics of both the more recent current data objects 218 used as the current set of training data objects 230 and previous data objects 220 used to generate the stored model 232. This results in a trained model 226 that more gradually adapts to changing population characteristics, rather than immediately interpreting a poorly performing subpopulation as being normal.

Various other clustering machine learning techniques may be applied to generate the trained model 226 from the selected training data objects 230. For example, techniques such as, but not limited to, Gaussian Mixture Models (GMM), hierarchical models, and variants thereof may be used to generate parametric hyperdimensional cluster definitions. The outlier data objects 224 may be selected based on their lack of correspondence and/or degree of a lack of correspondence to some or all of the clusters identified in the trained model 226. In some examples, data objects that do not fall into the identified clusters or a selected subset of the identified clusters may be selected as outlier data objects 224. For a probabilistic trained model 226, one or more probability values may be specified and adjusted in order to adjust the number of outlier data objects 224.

In different implementations, the outlier data objects 224 can be used to arrive at one or more targeting rules relating to respective subsets of the outlier data objects 224. Various techniques may be used to both identify subsets of interest and generate corresponding targeting rules 266. In some implementations, a user 250 (likely a software developer) may make use of a telemetry console 240 for the purpose of visualizing and understanding various attributes of the outlier data objects 224, as represented by a data object visualizer 248. In some cases, the data object visualizer and/or other aspects of the telemetry console 240 are capable of retrieving selected stored data objects 216 from the data object repository 214 and/or selected data from the targeted telemetry repository 220. In addition, a cluster visualizer 246 can be used to select, review, and/or adjust clusters for various subsets of the outlier data objects 224 that appear to be associated with respective issues of interest. A targeting rule condition selector 244 can be configured to permit the user 250 to select attributes and corresponding conditions effective for identifying telemetry sources 140 similar to a particular cluster. Furthermore, a targeting rule attribute selector 242 is configured to select context and performance attributes for which targeted attribute values 208 should be provided in response to targeted telemetry data item 206, resulting in a set of user-generated selection conditions 262. The conditions can be included in a set of selection conditions 264 on context attributes and/or performance attributes for each targeting rule 266.

In some implementations, the telemetry service 160 may provide functions that automate and/or facilitate the identification of clusters of the outlier data objects 224 and selection conditions for corresponding targeting rules. For example, the telemetry service 160 may include a machine-based cluster identifier 252 configured to receive the outlier data objects 224 and apply machine learning techniques (for example, an unsupervised clustering technique) to identify one or more outlier clusters 254 of potential significance. The applied machine-learning techniques provide more effective and reliable identification of significant clusters within a large number of high-dimensional outlier data objects 224 (for example, having 10 or more attributes) than with conventional approaches. Also, the applied machine-learning techniques evaluate a larger number of attributes than conventional approaches to successfully identify a small number of attributes, allowing for the recognition and use of attributes that otherwise might not have been considered with conventional techniques. For some issues, the fact that a particular attribute is effective offers a significant clue as to the underlying cause. Thus, the machine-based outlier cluster generator 252 gives a much improved ability to recognize new or evolving issues (which might have been missed using conventional approaches) and determine how to effectively and precisely target relevant telemetry sources 140.

In some examples, the cluster visualizer 246 is configured to obtain the outlier clusters 254 produced by machine-based cluster identifier 252 for review, selection, and/or modification by the user 250. With this, the user 250 obtains the above-mentioned benefits provided by the machine-based outlier cluster generator 252, while still being able to control and make adjustments to the automatically generated sets of clusters. For example, the user 250 may choose to ignore a cluster, choose to combine multiple clusters into a single cluster, or choose to adjust the definitions of the clusters. In some implementations, the cluster visualizer 246 allows the user 250 to review which outlier data objects 224 correspond to each of the outlier clusters 254, and identify outlier data objects 224 that should be included and/or excluded in particular clusters. In some implementations, the machine-based cluster identifier 252 may be configured to automatically generate a revised set of outlier clusters 254 that more closely correspond to the changes identified by the user 250 via the cluster visualizer 246.

In some implementations, the telemetry service 160 includes a machine-based condition generator 258 which is configured to receive the outlier clusters 254, which may have been produced by the machine-based outlier cluster generator 252 with or without modification by the user 250 via the telemetry console 240 and/or directly created by the user 250 via the telemetry console 240 (thereby bypassing the machine-based outlier cluster generator 252 for some or all of the outlier clusters 254) and generate a set of machine-generated selection conditions 260 for a targeting rule 266 for one or more of the outlier clusters 254. For example, the machine-based condition generator 258 may be configured to obtain a set of cluster parameters providing a parametric description of one of the outlier clusters 254, and automatically generate selection conditions (such as one or more mathematical and/or logical operations and associated parameters) relating to two or more context attributes and, for certain sets of cluster parameters, relating to one or more performance attributes. In some implementations, the machine-based condition generator 258 may be configured to automatically select individual clusters from the outlier clusters 254 based on an evaluation of the outlier clusters performed by the machine-based condition generator 258 or produced by the machine-based outlier cluster generator 252 in the course of generating the outlier clusters 254.

In some implementations, the machine-based condition generator 258 and/or the machine-based cluster identifier 252 are configured to apply one or more dimensionality reduction techniques (such as various feature selection and/or feature projection) towards a goal of reducing a number of attributes that must be collected to determine if a telemetry sources 140 satisfy the selection conditions 264 of the resulting targeting rule 266. In some implementations, scoring of sets of attributes is weighted against the use of attributes that are not used for the selection conditions or attribute lists of a group of targeting rules, towards a goal of reducing a total number attributes that must be collected by the telemetry sources 140 for a deployed set of targeting rules. This offers an optimization outside of the scope of conventional human-directed telemetry collection techniques. In some implementations, the machine-based condition generator 258 may propose a modification of an already deployed and currently active targeting rule 266 to target a cluster, and/or identify a deployed targeting rule 266 to deactivate or remove.

In some examples, the targeting rule condition selector 244 is configured to obtain the sets of machine-generated selection conditions 260 produced by the machine-based condition generator 258 for review, selection, and/or modification by the user 250. This provides the user 250 with a benefit of automated techniques to identify attributes and associated conditions and parameters effective for precisely selecting telemetry sources 140 that are similar to the identified clusters. At the same time, the user 250 can review and selectively make adjustments to the automatically generated machine-generated selection conditions 260. For example, the user 250 can eliminate an automatically selected attribute, change from using one attribute to a different attribute, use an additional attribute, and/or modify parameters to adjust the scope of the selection conditions 264 included in a targeting rule 266.

Each newly created targeting rule 266 includes selection conditions 264 obtained from the machine-generated selection conditions 260 and/or the user-generated selection conditions 262 for the targeting rule 266. The selection conditions 264 for a targeting rule 266 be used by a telemetry source 140 to determine whether it should provide telemetry according to the targeting rule 266. The selection conditions 264 allow dynamic population slicing to be performed by the telemetry sources 140 to effectively target telemetry source 140 that, based on an expected similarity with a particular subset of the outlier data objects 224 corresponding to the selection conditions 264, are likely to yield targeted telemetry data items 206 useful for determining if there is an issue that needs attention, characterizing the issue, identifying an underlying cause of the issue, resolving the issue (for example, by making associated code changes), and/or testing the issue. It is noted that over the course of performing such activities, the selection conditions 264 may be changed to modify the scope of the targeted subpopulation to more effectively meet the needs of the current activity. For example, the selection conditions 264 might be made more or less restrictive in response to a number of targeted telemetry data items 206 received for the targeting rule 266 to avoid collecting more targeted telemetry data items 206 than needed or to better ensure the size of the responding subpopulation of telemetry sources 140 is large enough to draw effective conclusions.

Each targeting rule 266 may also include an attribute list 268 (which may be referred to as a "targeted attribute list") including attribute identifiers for particular context attributes and/or performance attributes requested to be included in targeted telemetry data items 206 responsive to the targeting rule 266. In some examples, the targeting rule 266 provides instructions (for example, by including the instructions as part of the targeting rule 266 or by including a reference, such as a URI, for retrieving the instructions) for use by a telemetry source 140 to collect and/or process underlying context data and/or performance data for obtaining attribute values for one or more of the attributes included in the attribute list 268. In some examples, the attribute list 268 may include an attribute identifier for a summary attribute, with the attribute identifier including a base attribute identifier for which a significant amount of data may be collected over a period of time (for example, due to a large number of independent values), a summary format identifier indicating a summarization technique to apply, and, in some instances, one or more parameters for the summarization technique. For example, the summary format identifier may indicate a histogram should be provided, and a parameter may be included specifying a bucket size for the histogram. It is noted that an attribute list 268 of a targeting rule 266 may be changed over time to ensure that the resulting responsive targeted telemetry data items 206 provide the telemetry service 160 with attribute values 208 effective for the needs of the current activity. In general, if different information would better identify potential improvements, such as additional or different context attributes or performance attributes, a new or modified targeting rule 266 may be created and provided to the telemetry sources 140.

In some examples, the targeting rule 266 specifies an identifier (for example, a unique identifier for the targeting rule 266) that is to be included in responsive targeted telemetry data items 206. In some examples, the targeting rule 266 specifies a duration or period of time for collecting telemetry data for a targeted telemetry data item 206, and/or a maximum number of targeted telemetry data items 206 that should be generated by a telemetry source 140 in response to the targeting rule 266 (for example, only a single targeted telemetry data item 206, a specific number of targeted telemetry data items 206, or repeating without a maximum number). In some examples, the targeting rule 266 indicates whether generation of a responsive targeted telemetry data item 206 results in a generic telemetry data item 202 not being generated for a corresponding period of time. For example, a telemetry source 140 may be configured, as a default, to not generate a generic telemetry data item 202 due to a targeted telemetry data item 206 having been generated; however, for certain targeting rules 266 it may be desired to override this default and still generate a generic telemetry data item 202.

In some examples, the targeting rule 266 may specify one or more actions to be performed by a targeted telemetry source 140, such as, but not limited to, installing specified software (for example, a software installation package 180 or software update package 182), executing a software component, issuing a command to a software component (for example, to enable or disable a feature or modify an operating parameter) or setting a persistent value (for example, to set a flag identifying a telemetry source as being part of a selected subpopulation, which may be checked as part of the selection conditions for a later targeting rule). In some cases, a targeting rule 266 can specify an action and not include an attribute list 268, resulting in a telemetry source 140 determining it meets the selection conditions 268, performing the specified action as a result, but not generating a targeted telemetry data item 206.

The newly created targeting rule 266 is stored in a targeting rule storage 270 with other stored targeting rules 272. For modification of a stored targeting rule 272, corresponding portions of its selection conditions 264 are modified based on the machine-generated selection conditions 260 and/or the user-generated selection condition 262, and/or corresponding portions of its attribute list 268 are modified based on information received from the targeting rule attribute selector 242. In some implementations, a unique identifier or version identifier included in the stored targeting rule 272 may be updated to indicate that the stored targeting rule 272 has been changed.

It is noted that the various operations described above for the telemetry console 240 may also be performed outside of the context of processing a new set of outlier data objects 224 discussed above. In some implementations, the telemetry console 240 is configured to access the targeting rule storage 270 to obtain, modify, enable/disable, and/or remove selected stored targeting rules 272. In some implementations, the telemetry console 240 is configured to allow the user 250 to create a new targeting rule 266 from scratch or based on an existing stored targeting rule 272.

The telemetry service 160 also includes an updated rule provider 274 that is configured to provide the newly created targeting rule 266, stored in the targeting rule storage 270 as one of the stored targeting rules 272, to the telemetry sources 140 via the network 150. In some examples, updated rule provider 274 is configured to identify added, removed, or modified stored targeting rules 272; for example, the targeting rule storage 270 may be configured to notify the updated rule provider 274 of such changes. The updated rule provider 274 then provides associated information to the telemetry sources 140 as updated rules 276. In the example illustrated in FIG. 2, the updated rules 276 include and provide a new targeting rule 278 corresponding to the newly created targeting rule 266. Transfer of updated rules 276 and telemetry data items 200 between the telemetry sources 140 and the telemetry service 160 may be carried out in any suitable manner according to any suitable protocol. In some embodiments of the invention, such transfers may be carried out using the Hypertext Transfer Protocol (HTTP), which may or may not be secured. The updated rules 274 and telemetry data items 200 may be encoded and/or formatted in any suitable manner. By way of example, they may be formatted according to JavaScript Object Notation (JSON) or an agreed upon binary format. In some examples, attribute values 208 may be provided as key/value pairs, with the attribute identifiers included in a corresponding attribute list 268 used as keys.

In some implementations, the updated rule provider 274 simply provides the same updated rules 276 to each of the telemetry sources 140. In some implementations, the updated rule provider 274 provides the updated rules 276 to only selected subsets of the telemetry sources 140. In some implementations, different sets of the targeting rules 266 are generated based on the same outlier data objects 224 and are included in different updated rules 276 provided to different subsets of the telemetry sources 140. For example, each of the subsets of telemetry sources 140 may be configured do use a different URI to retrieve updated rules 276, and the updated rule provider 274 may be configured to provide a different updated rules 276 for each URI.

In some implementations, the telemetry service 160 is configured to automatically identify a subset of the outlier data objects 224 that may demonstrate a significant change in performance. In some examples, outlier data objects 224 selected from a previously analyzed set of data objects may be provided as, or included in, training data objects 230 provided to the ML model trainer 228 to generate a trained model 226 that is retained as an outlier model 234. Different training parameters may be applied to generate the outlier model 234 to better ensure it provides a more complete and/or detailed model of previously observed outlier characteristics. For a later analysis of data objects more recently obtained by the telemetry service 160, the object model 234 may be applied against the resulting new set of outlier data objects 234 to identify a subset of the new outlier data objects 234 that do not conform with the outlier model 234. The telemetry service 160 may be configured to determine if there is a significant cluster of the identified subset of the outlier data objects 234. In some implementations, a previously generated outlier cluster(s) 254 may be similarly applied.

Figure 3:
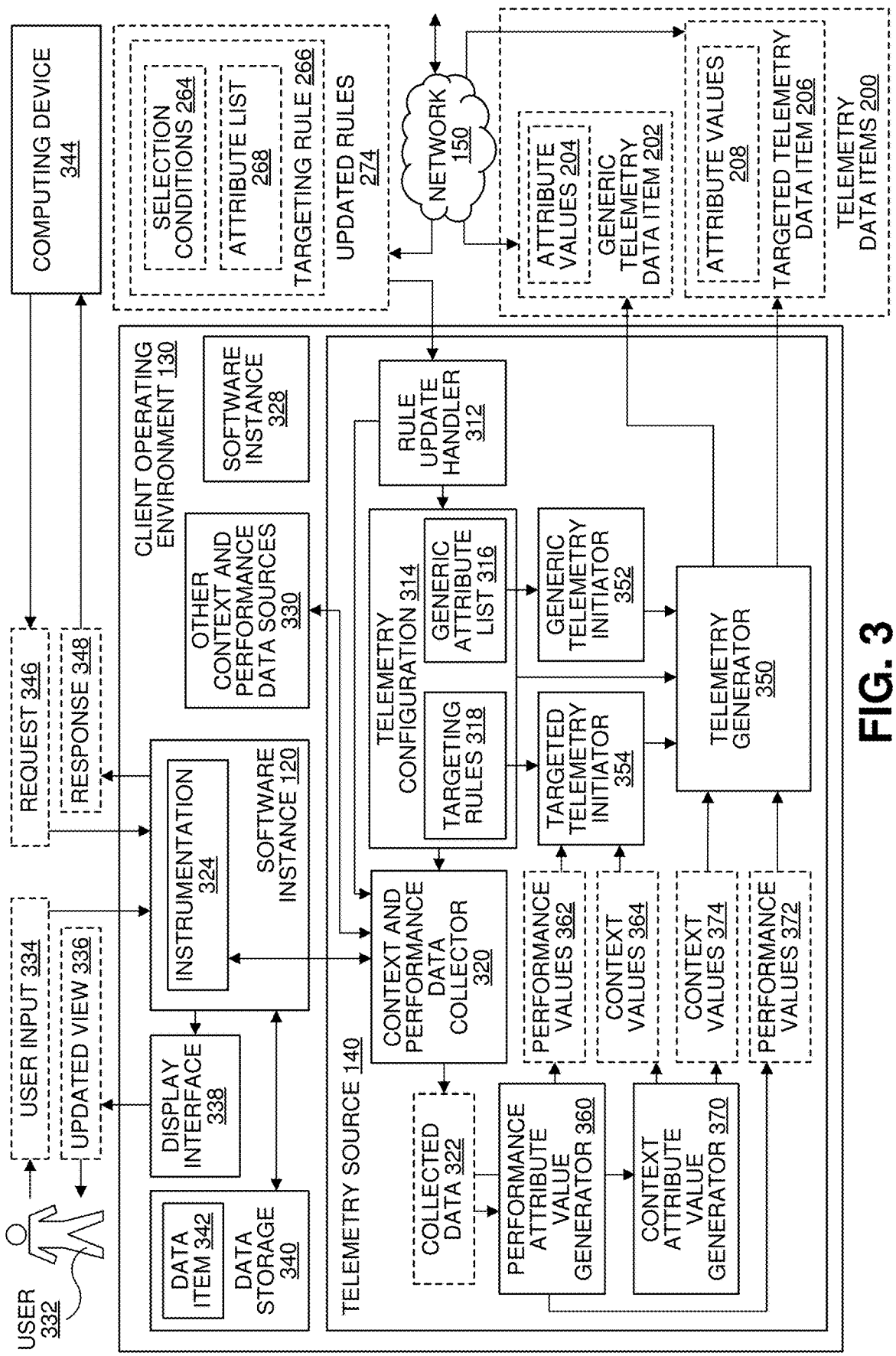
FIG. 3 is a conceptual diagram illustrating an implementation of a distributed computing environment architecture for collecting device telemetry data.

Referring now to FIG. 3, an example implementation of portions of a client device 110 is presented. More specifically, FIG. 3 shows an example of a software instance 120, a client operating environment 130 in which the software instance 120 is being executed, and a telemetry source 140 (which may also be referred to as a "telemetry controller") configured to collect performance- and context-related data, evaluate the collected data, and provide telemetry data items 200 consistent with a telemetry configuration 314 maintained in accordance with updated rules 276 provided by the telemetry service 160. It is noted that although FIG. 2 illustrates an example in which the telemetry source 140 and other performance data sources 330 execute within the same client operating environment 130 as the software instance 120, in other examples, some or all of the telemetry source 140 and other performance data sources 330 may instead operate outside of the client operating environment 130. As one example, the telemetry source 140 could be executed in a first virtual machine and the remaining features illustrated within the operating environment 130 could be executed in a different virtual machine.

The telemetry source 140 includes a rule update handler 312 configured obtain updated rules 276 provided by the telemetry service 160, as discussed for FIG. 2, and update corresponding portions of a telemetry configuration 314, such as portions of a generic attribute list 316, which identifies attributes for which generic attribute values 204 are included in generic telemetry data items 202, and targeting rules 318, which indicate respective selection conditions for identifying which, if any, of the targeting rules 318 will result in respective targeted telemetry data items 206, and identify attributes for which attribute values 208 are included in the targeted telemetry data items 206. For example, the rule update handler 312 may be configured to, in response to corresponding portions of received updated rules 276, add attributes to the generic attribute list 316, remove specific attributes from the generic attribute list 316, replace the generic attribute list 316 with a new set of attributes, remove specific targeting rules 318 from the telemetry configuration 314, modify specific portions of stored targeting rules 318, and add new targeting rules 266 to the targeting rules 318. For purposes of discussion, the example updated rules 276 shown in FIG. 3 provides a new targeting rule 278, in response to which the rule update handler 312 will add to the new targeting rule 278 the targeting rules 318.

In some implementations, the rule update handler 312 is configured to identify resulting changes to the attributes included in the generic attribute list 316, included in the attribute lists for each of the targeting rules 318, and attributes needed to evaluate the selection conditions for each of the targeting rules 318, and report the identified changes to a performance data collector 320 included in the telemetry source 140, which is configured to manage the collection of context data and performance data needed to generate the context attributes and the performance attributes needed according to the current telemetry configuration 314.

In the illustrated example, the current telemetry configuration 314 is configured to, according to details specified by the current telemetry configuration 314, collect various items of performance data and context data associated with various operations performed by various software components and the context in which those operations are performed. In some examples, a portion of the operations may be performed in response to user input 334, such as a mouse click on a particular portion of a UI, from a user 332 of the software instance 120. For example, the user input 334 may result in the software instance 120 performing a first portion of the operations, some of which may relate to an updated view 336 being displayed to the user 332 via a display interface 338. Alternatively or in addition, the user input 334 may result in the software instance 120 performing a second portion of the operations, some of which may relate to input/output (I/O) transactions with a data storage 340 to read or write a data item 342. In some other examples, another portion of the operations may be performed to provide a response 348 to a request 346 received from a computing device 344. For example, the request 346 may result in the software instance 120 performing a third portion of the operations, some of which may relate to one or more I/O transactions with the data storage 340 to read or write the data item 342.

Instrumentation is a technique in which instructions are added to one or more software components to capture performance data and/or context data for one or more operations performed by the software components. In some examples, including the example shown in FIG. 3, the software instance 120 includes instrumentation 324 directed to capturing performance data and/or context data (which may also be referred to as "instrumentation metrics") for the software instance 120. Instrumentation metrics may be collected in any suitable manner. In an example, a first instrumentation data may identify times at which a first component of the software instance 120 is executed, which may be used to generate an attribute for a frequency of use of this component. However, with an additional second instrumentation data identifying time when operations for the first component have completed, together the first and second instrumentation data may used to generate an attribute relating to amounts of time required to complete the operations.

The disclosed implementations can incorporate any of the features, components, methods, systems, software, and other aspects, including those relating to instrumenting software and performance monitoring, described in U.S. Patent Application Publication Numbers 2018/0285240 (entitled "INSTRUMENTING COMPUTER PROGRAMS FOR TELEMETRY DATA COLLECTION" and published on Oct. 4, 2018); 2018/0260304 (entitled "MAPPING DYNAMIC ANALYSIS DATA TO SOURCE CODE" and published on Sep. 13, 2018); 2018/0004573 (entitled "LOCKLESS MEASUREMENT OF EXECUTION TIME OF CONCURRENTLY EXECUTED SEQUENCES OF COMPUTER PROGRAM INSTRUCTIONS" and published on Jan. 4, 2018); 2017/0187782 (entitled "TELEMETRY RESPONSE SYSTEM" and published on Jun. 29, 2017); 2017/0147466 (entitled "MONITORING ACTIVITY ON A COMPUTER" and published on May 25, 2017); 2017/0132111 (entitled "MONITORING MOBILE APPLICATION PERFORMANCE" and published on May 11, 2017); 2017/0132057 (entitled "FULL DUPLEX DISTRIBUTED TELEMETRY SYSTEM" and published on May 11, 2017); 2017/0060731 (entitled "DYNAMICALLY PROVIDING APPLICATION ANALYTIC INFORMATION" and published on Mar. 2, 2017); 2015/0304398 (entitled "MEASURING ACTUAL END USER PERFORMANCE AND AVAILABILITY OF WEB APPLICATIONS" and published on Oct. 22, 2015); 2013/0346917 (entitled "CLIENT APPLICATION ANALYTICS" and published on Dec. 26, 2013); 2012/0167057 (entitled "DYNAMIC INSTRUMENTATION OF SOFTWARE CODE" and published on Jun. 28, 2012); 2012/0159454 (entitled "PROBE INSERTION VIA BACKGROUND VIRTUAL MACHINE" and published on Jun. 21, 2012); 2005/0210477 (entitled "Configurable collection of computer related metric data" and published on Sep. 22, 2005); and 2005/0021748 (entitled "Distributed data gathering and aggregation agent" and published on Jan. 27, 2005), each of which is incorporated by reference herein in their entireties.

In this example, the context and performance data collector 320 is configured to use the instrumentation 324 to obtain certain performance data and/or context data. In some examples, the context and performance data collector 320 is configured to selectively enable, disable, or configure portions of the instrumentation 324 based on performance data and/or context data being obtained. The context and performance data collector 320 is also configured to use other context and performance data sources 330 to obtain other performance data and/or context data. For example, context data about hardware or software related aspects of the client operating environment 130 (including, for example, aspects of the client device 110 on which it executes) may be obtained from records maintained by the client operating environment 130; for example, operating system records regarding a current state and/or configuration of the client operating environment 130, such as a listing of processes currently executing or details of hardware components. In some examples, the context and performance data collector 320 is configured to selectively enable, disable, or configure portions of the other context and performance data sources 330 based on performance data and/or context data being obtained. The context and performance data collector 320 may be configured to aggregate the collected data 322 obtained from such sources over time and multiple executions of associated operations.

Furthermore, in different implementations, the telemetry source 140 includes a targeted telemetry initiator 354, which may be invoked when a new targeting rule 318 is added to the telemetry configuration 314 or in accordance with a timing indicated in a first targeting rule 318 included in the current telemetry configuration 314. To determine whether the first targeting rule 318 should be applied according to its selection conditions, the targeted telemetry initiator 354 identifies the performance attributes used for the selection conditions and instructs a performance attribute generator 360 to perform the calculations necessary on the captured data 322 to generate performance attribute values 362 for the identified performance attributes. In addition, in response to determining that the first targeting rule 318 should be applied according to its selection conditions, the targeted telemetry initiator 354 identifies the context attributes used for the selection conditions and instructs a context attribute generator 370 to perform the calculations necessary on the captured data 322 to generate context attribute values 364 used for the selection conditions.

If the performance attribute values 362 and context attribute values 364 satisfy the selection conditions for the first targeting rule 318, the targeted telemetry initiator 354 determines that the first targeting rule 318 should be applied and instructs a telemetry generator 350 to produce a corresponding targeted telemetry data item 206. As discussed earlier with respect to the targeted telemetry initiator 354, the telemetry generator 350 identifies the performance attributes and the context attributes for the attribute values 208 included in the targeted telemetry data item 206. The telemetry generator 350 instructs the performance attribute generator 360 to generate performance attribute values 372 for the identified performance attributes. In addition, the telemetry generator 350 instructs the context attribute generator 370 to generate context attribute values 374 for the identified context attributes. The telemetry generator 350 can then generate the targeted telemetry data item 206 including the performance attribute values 372 and context attribute values 374 as the targeted attribute values 208. The telemetry source 140 transmits the generated targeted telemetry data item 206 to the telemetry service 160 via the network 150.

The telemetry source 140 also includes a generic telemetry initiator 352. In some implementations, the generic telemetry initiator 352 instructs the telemetry generator 350 to issue a new generic telemetry data item 202. In some implementations, if the telemetry source 140 has transmitted a targeted telemetry data item 206, the generic telemetry initiator 352 will wait to instruct the telemetry generator 350 to issue a new generic telemetry data item 202 until a predetermined period of time has elapsed since the last transmitted targeted telemetry data item 206. In response to the instruction received from the generic telemetry initiator 352, the telemetry generator 350 identifies the performance attributes and the context attributes included in the generic attribute list 316. The telemetry generator 350 instructs the performance attribute generator 360 to generate performance attribute values 372 for the identified performance attributes. In addition, the telemetry generator 350 instructs the context attribute generator 370 to generate context attribute values 374 for the identified context attributes. The telemetry generator 350 then generates the generic telemetry data item 202 including the performance attribute values 372 and context attribute values 374 as the attribute values 204. The telemetry source 140 then transmits the resulting generic telemetry data item 202 to the telemetry service 160 via the network 150.

The telemetry service 160 and other features discussed in FIGS. 1 and 2 may be used to produce targeting rules to implement A/B software component testing, and deploy such targeting rules to telemetry sources 140; in some cases, this may be done to evaluate whether an updated software component resolves a particular issue. For example, a first targeting rule may be created with first selection conditions specifically directed to a subpopulation affected by a performance-related issue, and the first targeting rule used to collect telemetry data that leads to a software change being developed to address the issue. In some examples, the software change may include instrumentation specifically added to assess the software change.

A second targeting rule (which may be newly created or a modification of the first targeting rule) is deployed, using second selection conditions to install the software change on a 'B' segment. For example, the second selection conditions may be generated by combining the first selection conditions with a further segmenting condition met by only a subportion of telemetry sources. The segmenting condition may implement a simple random sampling according to a selected probability. For example, a probability of selection of 50% may be obtained by a telemetry source obtaining a random number and determining whether the obtained number has an odd value. Preferably the segmenting condition performs an unbiased segmentation of telemetry sources. In some examples, the second selection conditions may include a further limitation limiting selection to telemetry sources 140 that have been opted-in for such testing. The second targeting rule also specifies an action directing a selected telemetry source to install the software change. In some examples, the second targeting rule would additionally specify an action setting a persistent value identifying a selected telemetry source as part of the 'B' segment; however, other approaches may be applied to similar effect, such as use of a software version identifier or detecting other effects resulting from the installation of the software change (for example, the presence of particular instrumentation). One or more targeting rules are deployed to collect new target telemetry data items for the 'A' and 'B' segments, which may be used to evaluate the software update.

It is noted that in addition to the above example for A/B software component testing, similar techniques may be applied via targeting rules to use dynamic population slicing to identify a subpopulation of telemetry sources (for example, by selection conditions directed to the subpopulation); divide that subpopulation into multiple segments (for example, by a random selection performed by a telemetry source evaluating the selection conditions); perform an action that results in the segments being configured differently (such as, but not limited to, installing a software component or configuring the segments with different operating parameters, such as for a software instance, operating system, or hardware component; and collect targeted telemetry data items from the segments for evaluation. Thus, this segmenting of a subpopulation may be performed throughout the process of resolving an issue, including, for example, investigating whether, or a degree to which, the issue is sensitive to selected configuration changes.

Figure 4:
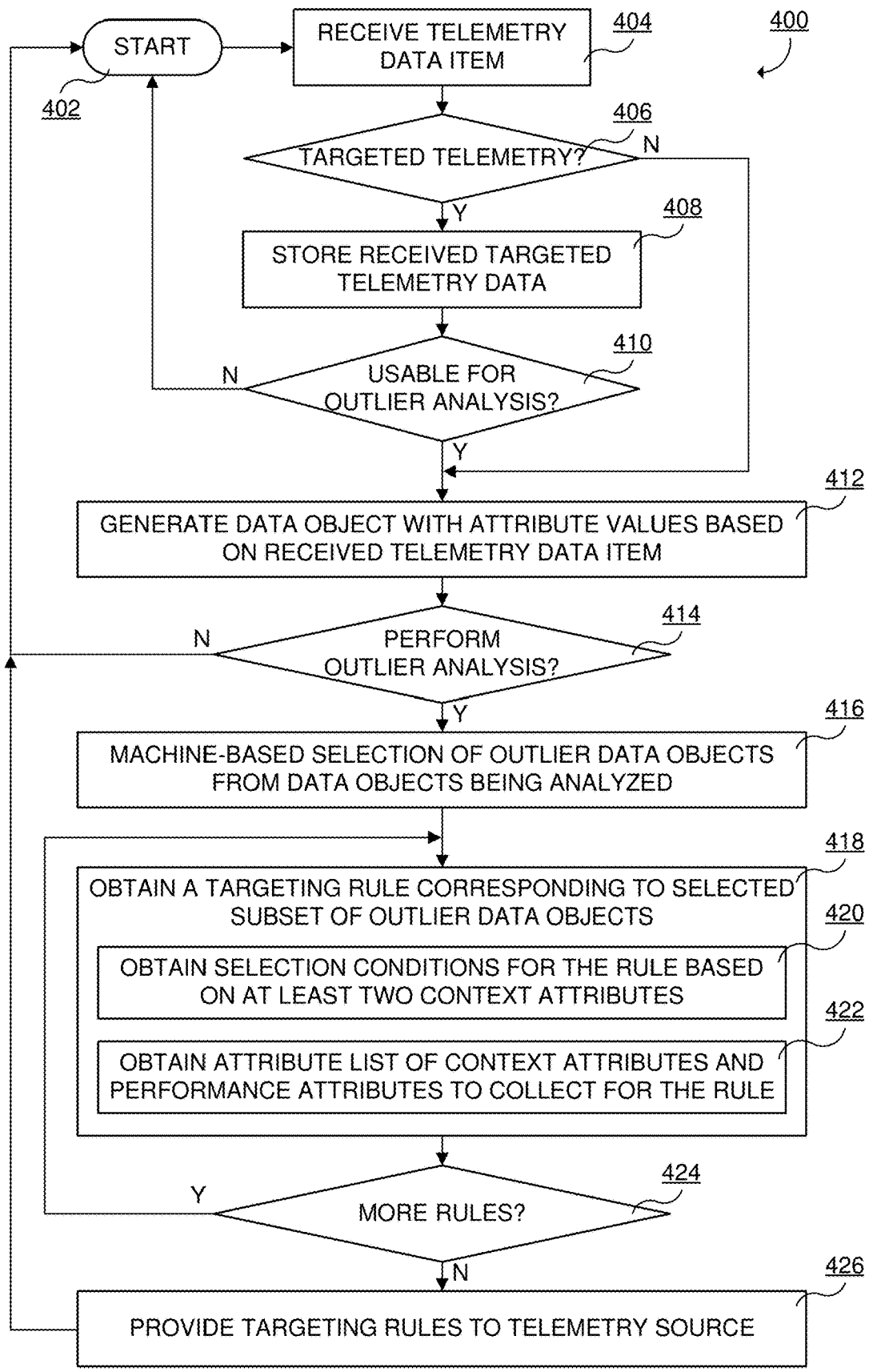
FIG. 4 is a flow diagram illustrating an implementation of a process for receiving telemetry data items and producing rules for use by devices implementing software instances.

Referring next to FIG. 4, a flow chart illustrating one example of a process 400 for analyzing telemetry data items, creating targeting rules for issues identified from the telemetry data items and providing the targeting rules to the telemetry sources. The process 400 begins at a "start" block 402, leading to a first step 404, in which the server receives telemetry data item(s) from one or more telemetry sources. In some implementations, in response to determining that the received telemetry data item is a targeted telemetry data item (first optional step 406), the server can store the received targeted telemetry data (second optional step 408) and further determine whether the targeted telemetry data item is usable for outlier analysis (third optional step 410). If the determination is negative, the process 400 returns to the start 402. In addition, if the server determines at first optional step 406 that the telemetry data item is not a targeted telemetry data item, it may skip or proceed directly to a second step 412 in which a data object is generated with attribute values based on the received telemetry data item. An outlier analysis is performed in a third step 414. If there are no outliers detected, the process 400 returns to the start 402. If outlier data objects are detected or otherwise identified, the server can continue with a machine-based selection of outlier data objects from the data objects being analyzed in a fourth step 416.

In the next stage of process 400, the server can obtain a targeting rule corresponding to a selected subset of outlier data objects (fifth step 418). This can include for example obtaining selection conditions for the targeting rule based on at least two context attributes (sixth step 420), and obtaining an attribute list of context attributes and performance attributes to collect for the targeting rule (seventh step 422). The process 400 can then determine whether there are more targeting rules in an eighth step 424. If an additional targeting rule is to be implemented and/or obtained, the process 400 can return to start 402. If there are no further targeting rules, the server can provide the targeting rules to telemetry sources in a ninth step 426.

Figure 5A:
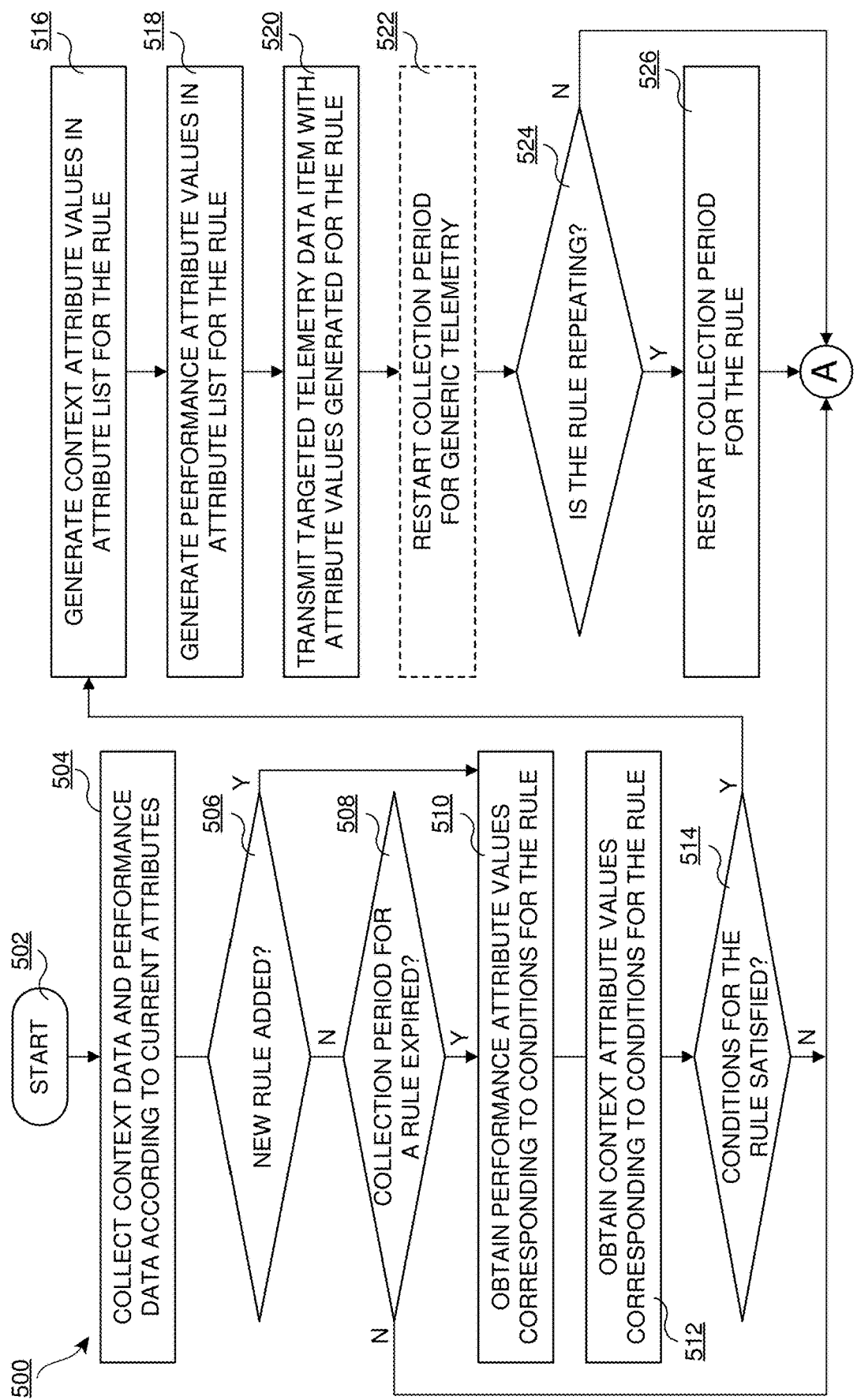
FIGS. 5A and 5B are flow diagrams illustrating an implementation of a process for identifying targeting rules that apply to a telemetry source and generating associated targeted telemetry data items as well as for generating generic telemetry data items.
Figure 5B:
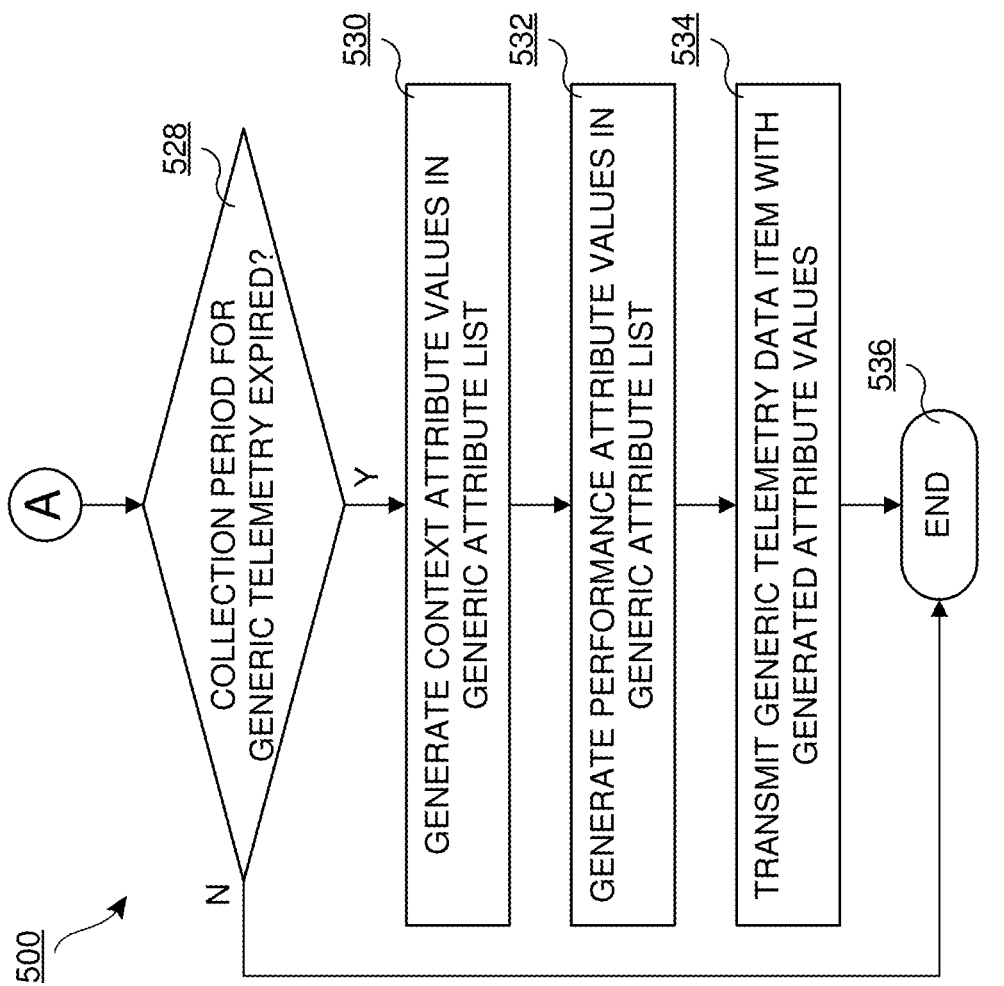

Referring now to FIGS. 5A and 5B, a flow chart illustrating one example of a process 500 for identifying targeting rules that apply to a telemetry source and generating associated targeted telemetry data items as well as for generating generic telemetry data items. The process 500 begins at a "start" block 502, leading to a first step 504, in which the telemetry source device collects performance data according to current performance attributes. The telemetry source can then determine whether the collection period for a targeting rule has expired in a second step 506. If it has expired, the process 500 will continue with a third step 508 in which performance metrics corresponding to the selection conditions for the targeting rule are obtained, as well as a fourth step 510 in which context values corresponding to selection conditions for the targeting rule are obtained. The telemetry source can then, at a fifth step 512, determine whether the selection conditions for the targeting rule are now satisfied. If the selection conditions are not satisfied, the process 500 continues at FIG. 5B below. If the selection conditions are satisfied, the process 500 continues at a sixth step 514 in which context attribute values in the attribute list for the targeting rule are generated, and performance attribute values in the attribute list for the targeting rule are also generated (seventh step 516). The targeted telemetry data item with attribute values generated for the targeting rule are then transmitted in an eighth step 518 to the server (see FIG. 4). At a ninth step 520, the collection period for generic telemetry is restarted. If the telemetry source determines that the targeting rule is repeating (tenth step 522), the collection period for the targeting rule can be restarted in eleventh step 524. If the targeting rule is determined to not be repeating, the process 500 continues by proceeding directly to the steps shown in FIG. 5B.

In FIG. 5B, the telemetry source can determine whether the collection period for the generic telemetry has expired (twelfth step 526). If it is determined that it has expired, the process 500 can move directly to an end block 534. If it is instead determined that it has not expired, the process 500 continues at a thirteenth step 528 in which context attribute values in the generic attribute list are generated, and at a fourteenth step 530 in which performance attribute values in the generic attribute list are generated. Finally, the generic telemetry data item with the generated attributed values is transmitted to the server in a fifteenth step 532, bring the process 500 to a close.

The detailed examples of systems, devices, and techniques described in connection with FIGS. 1-5B are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-5B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 6:
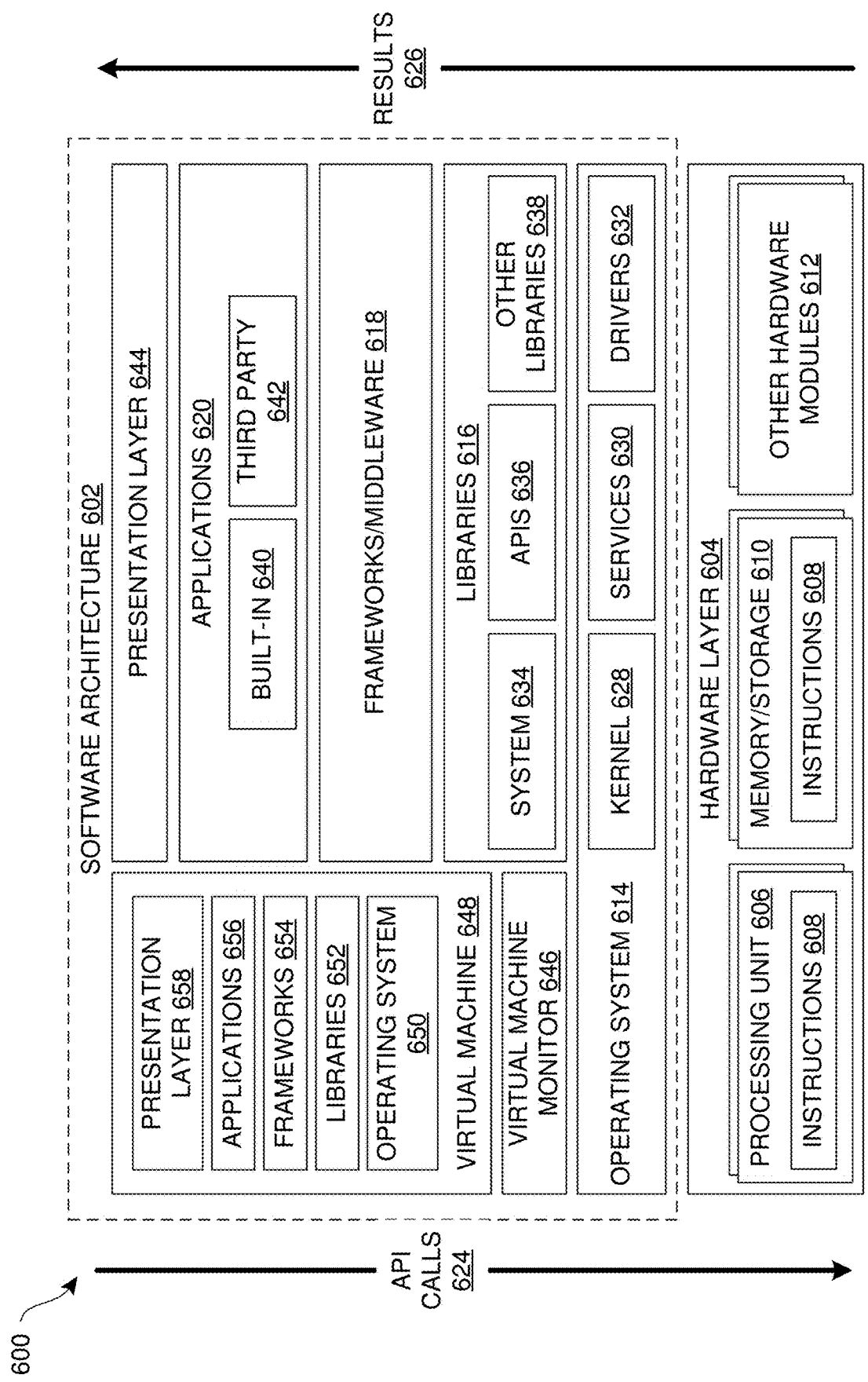
FIG. 6 is a block diagram of an example computing device, which may be used to provide implementations of the mechanisms described herein.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a device that includes, among other things, document storage, processors, memory, and input/output (I/O) components. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
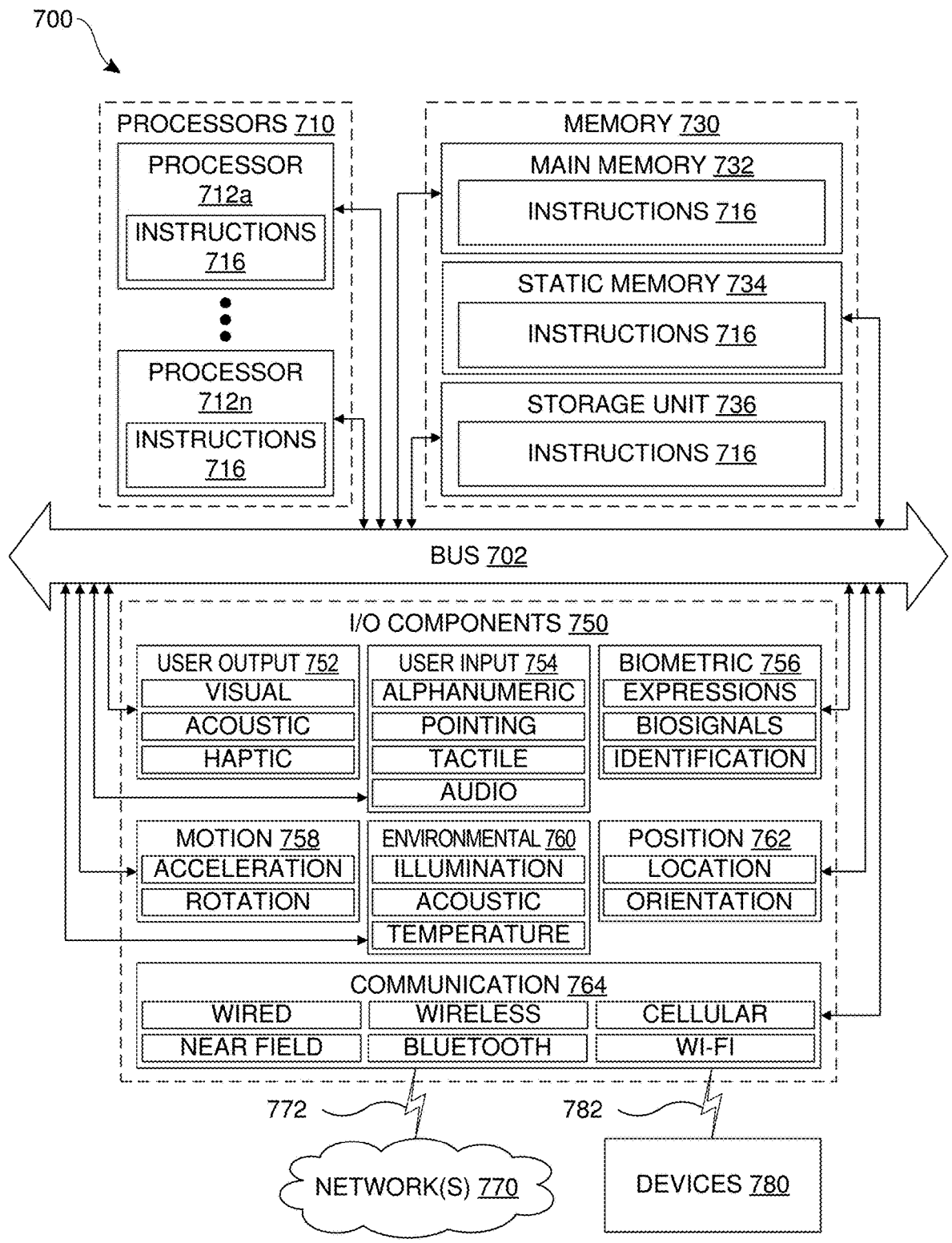
FIG. 7 is a block diagram illustrating components of an example machine configured to read instructions from a machine-readable medium.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" include a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

The disclosed implementations can incorporate any of the features, components, methods, systems, software, and other aspects described in U.S. Pat. No. 9,590,880 (entitled "DYNAMIC COLLECTION ANALYSIS AND REPORTING OF TELEMETRY DATA" and issued on Mar. 7, 2017) and U.S. Patent Application Publication Numbers 2018/0365093 (entitled "DETERMINING A LIKELIHOOD OF A RESOURCE EXPERIENCING A PROBLEM BASED ON TELEMETRY DATA" and published on Dec. 20, 2018); 2018/0300180 (entitled "RESOURCE DEPLOYMENT USING DEVICE ANALYTICS" and published on Oct. 18, 2018); 2018/0234443 (entitled "SYSTEM AND METHOD FOR DETECTING ANOMALIES INCLUDING DETECTION AND REMOVAL OF OUTLIERS ASSOCIATED WITH NETWORK TRAFFIC TO CLOUD APPLICATIONS" and published on Aug. 16, 2018); 2017/0147466 (entitled "MONITORING ACTIVITY ON A COMPUTER" and published on May 25, 2017); 2016/0147585 (entitled "PERFORMANCE ANOMALY DIAGNOSIS" and published on May 26, 2016); 2014/0189086 (entitled "COMPARING NODE STATES TO DETECT ANOMALIES" and published on Jul. 3, 2014); 2013/0346466 (entitled "IDENTIFYING OUTLIERS IN A LARGE SET OF OBJECTS" and published on Dec. 26, 2013); 2013/0343619 (entitled "DENSITY ESTIMATION AND/OR MANIFOLD LEARNING" and published on Dec. 26, 2013); and 2010/0251218 (entitled "DYNAMIC COLLECTION OF INSTRUMENTATION DATA" and published on Sep. 30, 2010), each of which is incorporated by reference herein in their entireties.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of telemetry data collection, the method comprising:
   receiving a first plurality of telemetry data items each associated with a different software instance and including a first value for a first performance measurement of the associated software instance;
   for each telemetry data item included in the first plurality of telemetry data items, generating a respective data object included in a first plurality of data objects, the generated data object providing values for a first set of attributes including:
      a plurality of context attributes each describing an operating environment in which the first value was measured, and
      a performance attribute measuring performance of a software instance, wherein a value for the performance attribute is determined based on at least the first value included in the telemetry data item;
   performing a machine-based selection of a first plurality of outlier data objects from the first plurality of data objects based on at least the first set of attributes;
   obtaining a first targeting rule specifying first selection conditions for at least two of the plurality of context attributes, the first selection conditions corresponding to a selected subset of the first plurality of outlier data objects;
   providing the first targeting rule to a plurality of telemetry sources; and
   receiving a second plurality of telemetry data items each associated with a different telemetry source that satisfied the first selection conditions, and each including a second value for a second performance measurement of an associated software instance, wherein the first plurality of telemetry data items do not include values for the second performance measurement.

2. The method of claim 1, further comprising:
   identifying a plurality of clusters of the first plurality of outlier data objects via a machine-based clustering of the first plurality of outlier data objects; and
   generating the first selection conditions based on parameters of a first cluster included in the identified plurality of clusters.

3. The method of claim 1, further comprising:
   before receiving the first plurality of telemetry data items, receiving a third plurality of telemetry data items each associated with a different software instance and each including a value for the first performance measurement; and
   for each telemetry data item included in the third plurality of telemetry data items, generating a respective data object included in a second plurality of data objects, the generated data object providing values for the first set of attributes; and
   generating a machine-trained model based on at least the second plurality of data objects,
   wherein the machine-based selection of the first plurality of outlier data objects is performed using the machine-trained model.

4. The method of claim 1, wherein the second performance measurement is a latency measurement for a selected operation.

5. The method of claim 1, wherein:
   the first targeting rule specifies a plurality of performance attributes requested to be included in telemetry data items generated in response to the first targeting rule; and
   the plurality of performance attributes includes a first performance attribute corresponding to the second performance measurement.

6. The method of claim 5, wherein:
   the plurality of performance attributes includes a second performance attribute;
   the first targeting rule includes a summary format identifier indicating a summarization technique to apply to generate a third value to be included in a responsive telemetry data item, the third value providing a summarization of a larger amount of data according to the indicated summarization technique.

7. The method of claim 1, wherein the first plurality of telemetry data items includes a plurality of generic telemetry data items providing values for a generalized set of context attributes and performance attributes.

8. The method of claim 1, further comprising:
   obtaining a second targeting rule specifying second selection conditions combining third selection conditions corresponding to a target subpopulation of telemetry sources and a segmenting condition resulting in a random selection of telemetry sources, and specifying an action to be performed by telemetry sources satisfying the second selection conditions, the action causing a configuration change of a telemetry source;
   obtaining a third targeting rule specifying fourth selection conditions corresponding to the target subpopulation of telemetry sources;
   providing the second targeting rule and the third targeting rule to a plurality of telemetry sources; and
   receiving a third plurality of telemetry data items each associated with a different telemetry source that satisfied the fourth selection conditions.

9. The method of claim 1, further comprising:
   for each telemetry data item included in the second plurality of telemetry data items, generating a respective data object included in a second plurality of data objects, the generated data object providing values for a second set of attributes;
   performing a machine-based selection of a second plurality of outlier data objects from the second plurality of data objects based on at least the second set of attributes;
   obtaining a second targeting rule specifying second selection conditions for at least two of the second set of attributes, the second selection conditions corresponding to a selected subset of the second plurality of outlier data objects;
   providing the second targeting rule to a plurality of telemetry sources; and
   receiving a third plurality of telemetry data items each associated with a different telemetry source that satisfied the second selection conditions.

10. A machine-readable medium storing instructions which, when executed by one or more processors, cause the processors to perform the method of claim 1.

11. A telemetry data collection system comprising:
one or more processors;
one or more machine-readable media storing instructions which, when executed by the processors, cause the processors to:
receive a first plurality of telemetry data items each associated with a different software instance and including a first value for a first performance measurement of the associated software instance;
for each telemetry data item included in the first plurality of telemetry data items, generate a respective data object included in a first plurality of data objects, the generated data object providing values for a first set of attributes including:
a plurality of context attributes each describing an operating environment in which the first value was measured, and
a performance attribute measuring performance of a software instance,
wherein a value for the performance attribute is determined based on at least the first value included in the telemetry data item;
perform a machine-based selection of a first plurality of outlier data objects from the first plurality of data objects based on at least the first set of attributes;
obtain a first targeting rule specifying first selection conditions for at least two of the plurality of context attributes, the first selection conditions corresponding to a selected subset of the first plurality of outlier data objects;
provide the first targeting rule to a plurality of telemetry sources; and
receive a second plurality of telemetry data items each associated with a different telemetry source that satisfied the first selection conditions, and each including a second value for a second performance measurement of an associated software instance, wherein the first plurality of telemetry data items do not include values for the second performance measurement.

12. The telemetry data collection system of claim 11, wherein the instructions further cause the processors to:
identify a plurality of clusters of the first plurality of outlier data objects via a machine-based clustering of the first plurality of outlier data objects; and
generate the first selection conditions based on parameters of a first cluster included in the identified plurality of clusters.

13. The telemetry data collection system of claim 11, wherein the instructions further cause the processors to:
before receiving the first plurality of telemetry data items, receive a third plurality of telemetry data items each associated with a different software instance and each including a value for the first performance measurement; and
for each telemetry data item included in the third plurality of telemetry data items, generate a respective data object included in a second plurality of data objects, the generated data object providing values for the first set of attributes; and
generate a machine-trained model based on at least the second plurality of data objects,
wherein the machine-based selection of the first plurality of outlier data objects is performed using the machine-trained model.

14. The telemetry data collection system of claim 11, wherein the second performance measurement is a latency measurement for a selected operation.

15. The telemetry data collection system of claim 11, wherein:
the first targeting rule specifies a plurality of performance attributes requested to be included in telemetry data items generated in response to the first targeting rule; and
the plurality of performance attributes includes a first performance attribute corresponding to the second performance measurement.

16. The telemetry data collection system of claim 15, wherein:
the plurality of performance attributes includes a second performance attribute;
the first targeting rule includes a summary format identifier indicating a summarization technique to apply to generate a third value to be included in a responsive telemetry data item, the third value providing a summarization of a larger amount of data according to the indicated summarization technique.

17. The telemetry data collection system of claim 11, wherein the first plurality of telemetry data items includes a plurality of generic telemetry data items providing values for a generalized set of context attributes and performance attributes.

18. The telemetry data collection system of claim 11, wherein the instructions further cause the processors to:
obtain a second targeting rule specifying second selection conditions combining third selection conditions corresponding to a target subpopulation of telemetry sources and a segmenting condition resulting in a random selection of telemetry sources, and specifying an action to be performed by telemetry sources satisfying the second selection conditions, the action causing a configuration change of a telemetry source;
obtain a third targeting rule specifying fourth selection conditions corresponding to the target subpopulation of telemetry sources;
provide the second targeting rule and the third targeting rule to a plurality of telemetry sources; and
receive a third plurality of telemetry data items each associated with a different telemetry source that satisfied the fourth selection conditions.

19. The telemetry data collection system of claim 11, wherein the instructions further cause the processors to:
for each telemetry data item included in the second plurality of telemetry data items, generate a respective data object included in a second plurality of data objects, the generated data object providing values for a second set of attributes;
perform a machine-based selection of a second plurality of outlier data objects from the second plurality of data objects based on at least the second set of attributes;
obtain a second targeting rule specifying second selection conditions for at least two of the second set of attributes, the second selection conditions corresponding to a selected subset of the second plurality of outlier data objects;
provide the second targeting rule to a plurality of telemetry sources; and
receive a third plurality of telemetry data items each associated with a different telemetry source that satisfied the second selection conditions.

* * * * *